(12) United States Patent
Wiens et al.

(10) Patent No.: US 6,363,376 B1
(45) Date of Patent: Mar. 26, 2002

(54) METHOD AND SYSTEM FOR QUERYING AND POSTING TO MULTIPLE CAREER WEBSITES ON THE INTERNET FROM A SINGLE INTERFACE

(75) Inventors: Ken Wiens, San Jose; Luo Wang, Walnut Creek; Zoey Zhao, Redwood City, all of CA (US)

(73) Assignee: Individual Software, Inc., Pleasanton, CA (US)

( * ) Notice: Subject to any disclaimer, the term of this patent is extended or adjusted under 35 U.S.C. 154(b) by 0 days.

(21) Appl. No.: 09/626,428

(22) Filed: Jul. 27, 2000

Related U.S. Application Data

(60) Provisional application No. 60/146,658, filed on Aug. 2, 1999.

(51) Int. Cl.[7] .............................................. G06F 17/30
(52) U.S. Cl. .......................................... 707/3; 707/104
(58) Field of Search .............................. 707/3, 104, 1, 707/4, 5, 6, 7, 101, 102; 705/1

(56) References Cited

U.S. PATENT DOCUMENTS

| | | | |
|---|---|---|---|
| 5,164,897 A | 11/1992 | Clark et al. ..................... 705/1 |
| 5,696,918 A | 12/1997 | Barker et al. ................. 707/517 |
| 5,832,497 A * | 11/1998 | Taylor ......................... 707/104 |
| 5,884,270 A | 3/1999 | Walker et al. .................. 705/1 |
| 5,884,272 A | 3/1999 | Walker et al. .................. 705/1 |
| 5,963,949 A | 10/1999 | Gupta et al. ................. 707/100 |
| 5,978,768 A | 11/1999 | McGovern et al. ............ 705/1 |
| 5,987,446 A * | 11/1999 | Corey et al. ................... 707/3 |
| 5,999,939 A | 12/1999 | De Hilster et al. ......... 707/102 |
| 6,058,435 A | 5/2000 | Sassin et al. ................ 709/305 |
| 6,266,659 B1 * | 7/2001 | Nadkarni ....................... 707/3 |
| 6,272,467 B1 * | 8/2001 | Durand et al. ................. 705/1 |

* cited by examiner

*Primary Examiner*—Sanjiv Shah
(74) *Attorney, Agent, or Firm*—Sawyer Law Group LLP

(57) ABSTRACT

A method and system for querying multiple career websites from a single interface is disclosed, where each of the websites comprises a plurality of web pages having site-specific fields requiring input of data. The method and system include collecting information from a user, and mapping the user information to the site-specific fields of each of the career websites. The method and system further include automatically filling-in the site-specific fields of each of the career websites with the mapped user information, and forming respective query strings from the filled-in site-specific fields for each of the career websites. The respective query strings are then submitted to the corresponding career websites.

49 Claims, 12 Drawing Sheets

METHOD AND SYSTEM FOR QUERYING AND POSTING TO MULTIPLE CAREER WEBSITES ON THE INTERNET FROM A SINGLE INTERFACE

CROSS-REFERENCE TO RELATED APPLICATION

This application is claiming under 35 USC 120 the benefit of provisional patent application serial no. 60/146,658 filed on Aug. 2, 1999.

FIELD OF THE INVENTION

The present invention relates to PC software applications that access the Internet, and more particularly to a method and system for querying and posting to multiple career websites on the Internet from a single interface.

BACKGROUND OF THE INVENTION

Internet career websites are global online networks for careers that connect companies providing job opportunities with qualified individuals seeking jobs. For job seekers, career websites offer a host of features, which typically include job listings, resume management, personal job search agents, chat and message boards, privacy options, expert advice and career management. Because different jobs may be posted on different career websites, individuals typically make use of more than one career website to maximize their results. Each of the career websites, however, typically requires the user to login and enter job search criteria. Therefore, the user must repeat entering this information at each of the sites.

PC software applications have been developed that are designed to make job searching and submission of a resume to multiple career websites easier for the individual.

One such PC application connects to multiple career websites over the Internet and allows users to submit their resumes online. The application would prompt the user for information and store the user information into fields in a database. When the user wanted to submit the information to one of the career websites, the application would format the data and send it to the career website. Because each career website requests different user information and store's the information in different database fields, each career website that communicated with PC application required customized software from the career website for receiving the data from the application and for translating the data from the application's format into the career website's format.

The problem with this approach is that if the application is changed or if any of the career websites change implementation, then both the application and the customized software for each of the career websites needs to be updated. Thus, the customization required to integrate the application with the career websites significantly hindered the adoption of the application by additional career websites. An additional drawback is that the PC application had no job searching capability, requiring the user to go outside of the program and manually search each job site individually.

The assignee of the present application developed a resume and job search PC application that improved on the prior approach. This application incorporated a job finder feature whereby the user could enter search criteria for multiple career websites and the results would be displayed in one location. However, because each career website has different fields for searching and uses different names for some of those same fields, the application only let the user enter job search criteria into fields that were common to all the career websites. For example, some career websites allow the user to search for a job location by city and state, while others only allow the user to search by state. Therefore, to keep the search common to all sites, the PC application would only allow the user to search for job location by state. Due to the generic nature of this job search, the application was incapable of providing job seekers with search results that were as focused as could have been achieved on the career websites themselves.

The PC application also included a resume submission feature that would submit the user's resume to multiple career websites. However, once the user submitted his or her resume, the user had no way to access the resume. Thus, if the user found a mistake on the resume, the user had to edit the resume on the PC and then resubmit the resume to the career websites through the PC application. In addition, once the user found a job and wanted to end the job search, the user did not have the capability of removing the resume from the career websites.

Accordingly, what is needed is an improved method and system for searching for jobs and submitting resumes on multiple career websites. The present invention addresses such a need.

SUMMARY OF THE INVENTION

The present invention provides a method and system for querying and posting to multiple career websites from a single interface, where each of the websites comprises a plurality of web pages having site-specific fields requiring input of data. The method and system include collecting information from a user, including the user's resume, and mapping the user information to the site-specific fields of each of the career websites. The method and system further include automatically filling-in the site-specific fields of each of the career websites with the mapped user information, and forming respective query strings from the filled-in site-specific fields for each of the career websites. The respective query strings are then submitted to the corresponding career websites.

According to the system and method disclosed herein, the present invention combines the benefit of one-click searching with the benefit of entering search criteria specific to each career website 14 for more powerful searching all within one interface.

DETAILED DESCRIPTION

The present invention relates to querying multiple career websites on the Internet from a single interface, including generating resumes and automatically submitting resumes to the career websites on the Internet. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

Figure 1:
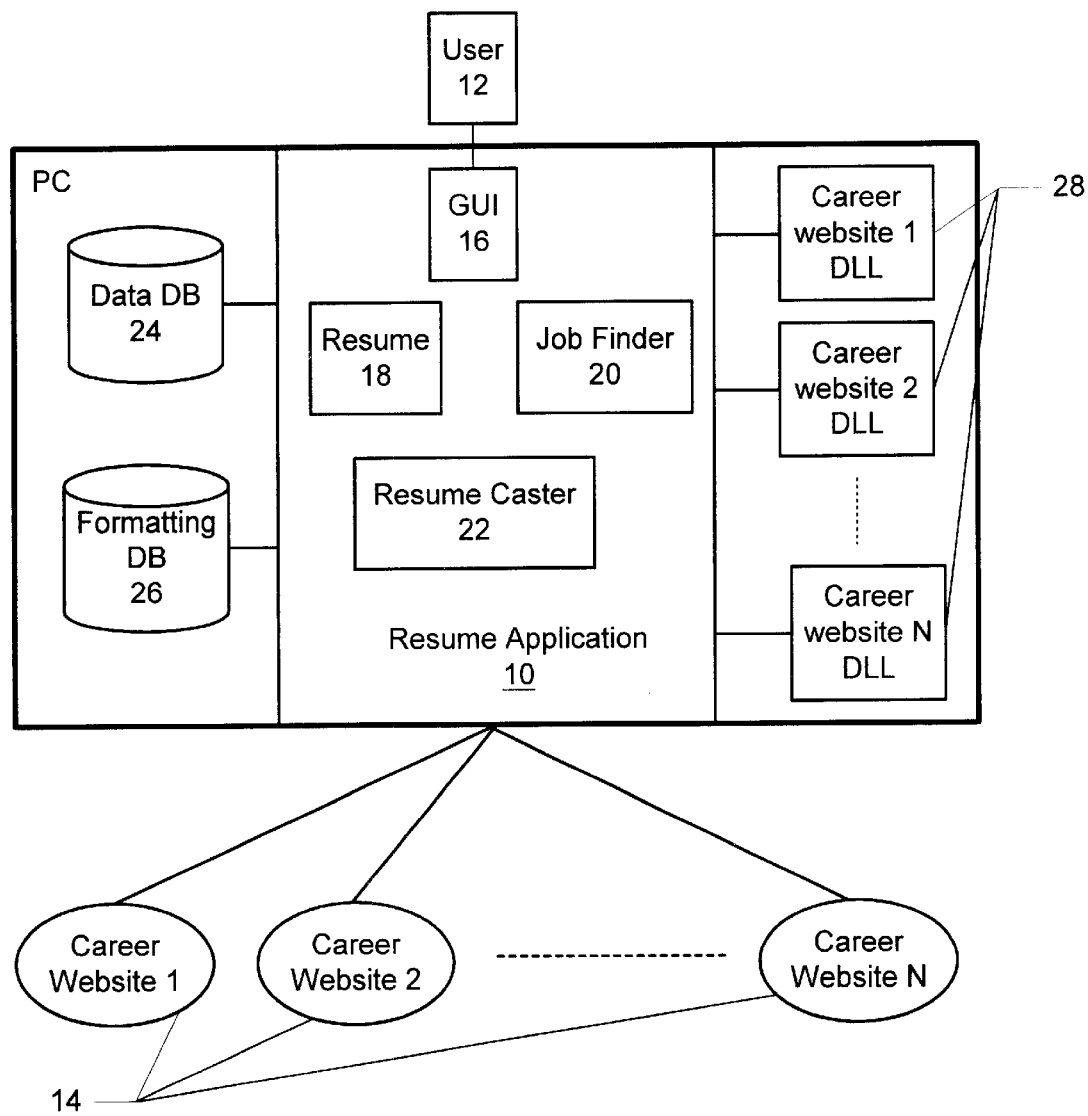
FIG. 1 is a block diagram illustrating a system for querying multiple career websites on the Internet from a single interface in accordance with a preferred embodiment of the present invention.

FIG. 1 is a block diagram illustrating a system for querying multiple career websites on the Internet from a single interface in accordance with a preferred embodiment of the present invention. The present invention is a PC-based resume application 10 that aids users 12 in creating electronic resumes and searching multiple career websites 14 over the Internet through a graphical user interface 16. The resume application 10 includes several features for aiding the user 12 in searching for jobs, including a resume section 18, a job finder section 20, and a resume caster section 22. The resume application 10 also includes a data database 24 for storing information entered by the user 12, and a formatting database 26 for storing templates, styles, and other formatting information that may be applied to the users resume.

The resume application 10 further includes career website direct-link-libraries (DLLs) 28 for each of the career websites 14 that link to the resume application 10 at runtime through a generic application programming interface. Each of the DLLs 28 include information regarding the functionality of the corresponding career website 14 that the resume application 10 accesses. For example, each career website 14 provides different services on different web pages within the site. Further, each of the career websites 14 requests the user to enter information into site-specific fields within those web pages. As career websites 14 change their functionality overtime and as new career websites 14 are added, new DLLs 28 may be loaded onto the user's PC for use by the resume application 10. In a preferred embodiment the DLL's 28 are updated and downloaded automatically by the application 10.

According to the present invention, besides aiding the user 12 in generating an effective resume, the resume application 10 allows a user 12 to search for jobs and the submit resumes to the multiple career websites 14 all within interface 16 of the resume application 10. Both the user's job search criteria and the user's resume are formulated into query strings and sent to each of the career websites 14.

Figure 2:
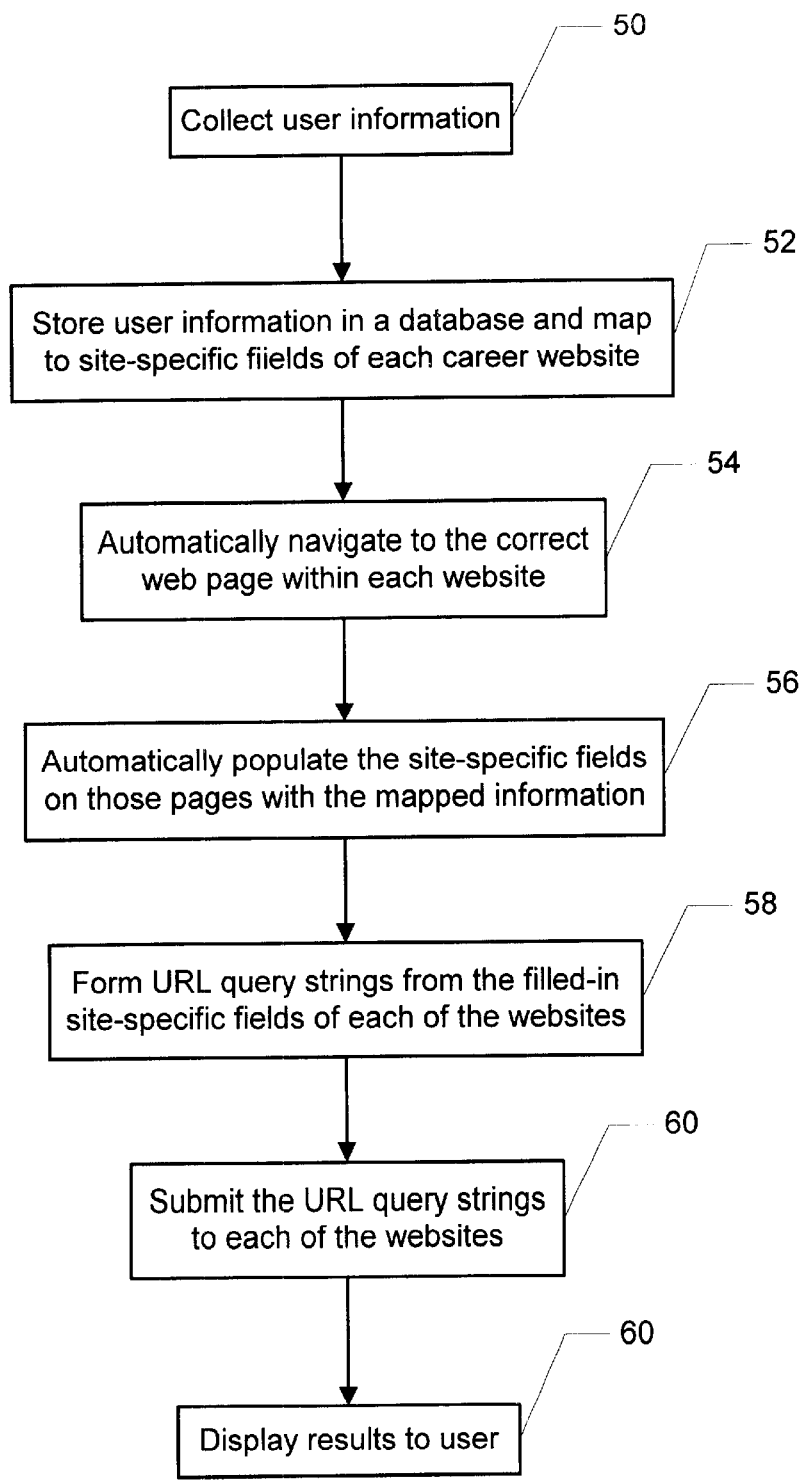
FIG. 2 is a flow chart illustrating a process for allowing users to querying multiple career websites from the resume application in accordance with a preferred embodiment of the present invention.

FIG. 2 is a flow chart illustrating a process for allowing users to querying multiple career websites from the resume application in accordance with a preferred embodiment of the present invention. Referring to both FIGS. 1 and 2, the process begins by collecting information from the user in step 50. Information is collected by displaying forms to the user in which the user enters data in the respective fields. For example, when searching for job, the user would invoke the job finder section 20 and enter job search criteria into the job finder form. When submitting a resume, the user would invoke the resume section 18 and enter name, address, work history and experience information into resume fields.

The information collected from the user is then stored in the database 24 and mapped to site-specific fields of each of the career websites 14 in step 52. The resume application 10 then automatically navigates to the correct web page within each of the career websites 14 for the service being requested in step 54. After navigating to correct web page at each of the career websites 14, the resume application 10 automatically fills-in the site-specific fields on those pages with the mapped user information in step 56. in a preferred embodiment, the site-specific fields are filled-in using dynamic HTML.

The resume application 10 then forms respective query strings from the filled-in site-specific fields of each of the career websites 14 in step 58, and submits the respective query strings to the corresponding career websites in step 60. If necessary, the resume application 10 displays in the results returned from each of the career websites 14 through the user interface 16 in step 62.

The operation of the resume section 18, the job finder section 20, and a resume caster section 22 will now be described.

The resume section 18 is a step-by-step guided resume system that helps job seekers create professional resumes. Through a guided resume wizard, job seekers are prompted for all relevant information with a card-like interface with next/back buttons that collects relevant information from the user 12 for each section of a resume.

In a preferred embodiment, the guided resume wizard of the resume section 18 includes several data entry features and several data formatting features that facilitate the generation of a resume. The data entry features include a title selector feature and a pre-written phrases/words feature. The title selector feature is a drop-down list displayed at each stage during the step-by-step wizard for the user to enter or change the name of a particular resume section, or Section Title, on the resume. For instance, for OBJECTIVE, the user can easily choose, OPENING STATEMENT, SUMMARY etc. directly from a drop down list. This will rename the section of the resume to fit the user preference. For EMPLOYMENT, users can easily change to EMPLOYMENT SUMMARY or EXPERIENCE.

The pre-written phrases/words is a data entry feature that includes a set of buttons displayed at each stage of the step-by-step wizard that assist the user in writing the resume. An action phrases button provides a list of pre-written phrases for the major sections of a resume, including OBJECTIVE, SKILLS/ABILITIES, EXPERIENCE, and EDUCATION. An action words button provides a listing of 3,600 action words which are used to empower the user resume. Job Descriptions is a listing of over 100,000 pre-written job description for every major career.

Figure 3:
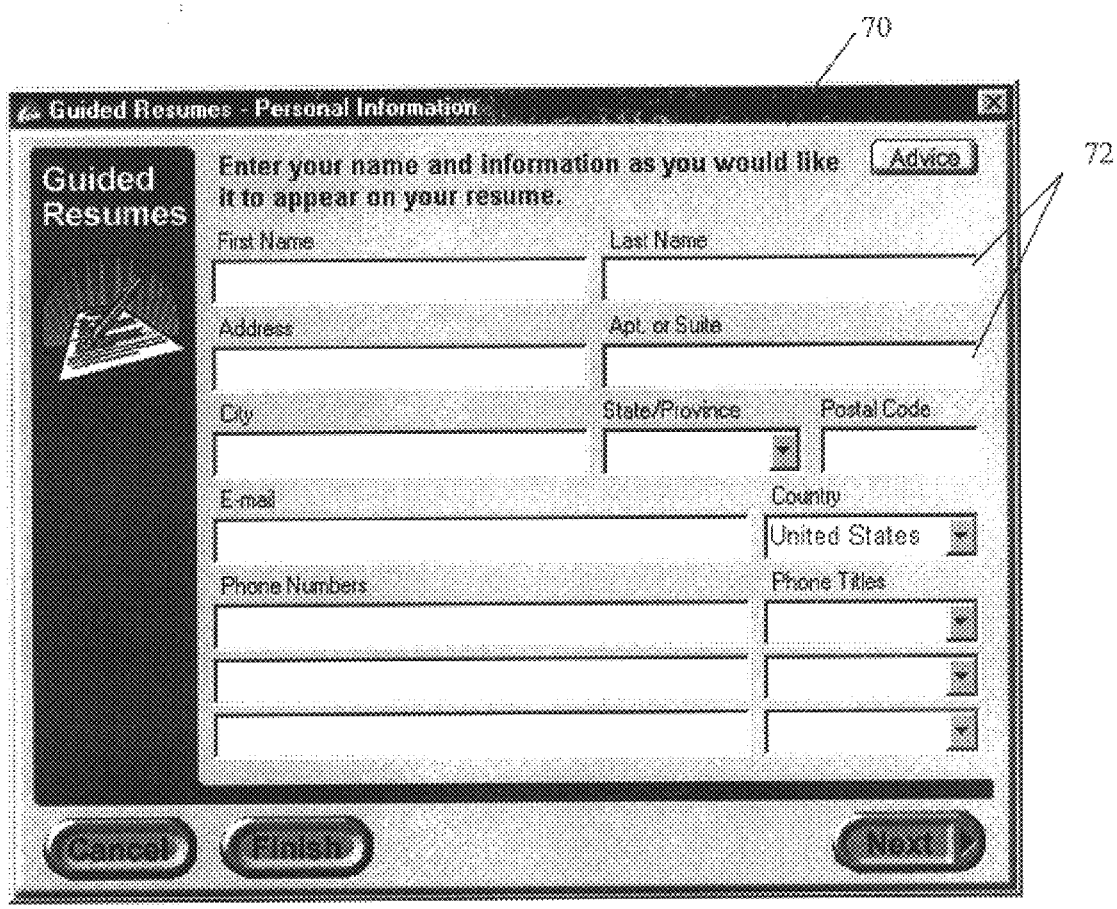
FIG. 3 is a block diagram illustrating an example card displayed to the user during data entry in the resume section of the resume application.

FIG. 3 is a block diagram illustrating an example card 70 displayed to the user during data entry in the resume section 18 of the resume application 10. The card includes a series of fields 72 for the user to enter the requested information. After the card 72 is filled in by the user 12, the data in the fields is stored in the database 24.

After completing the data entry process for the resume, the user 12 may use the data formatting features of the resume section 18. The data formatting features include a single-click resume styles feature, an apply-to-all feature, and a date format/date separator feature. The single-click resume styles is a feature that allows the user 12 to choose a resume style from pre-formatted templates, which are stored in the formatting database 26. The user 12 is shown a description and graphical preview of each of the formatting styles. The user 12 may also choose the font to apply to that style. Once the style and font has been selected, the user 12 clicks an OK button and the entire resume is transformed into that particular style.

The apply-to-all feature allows the user 12 to maintain this consistent formatting. In a resume, there are common text sections which should retain a consistent format (i.e. the name of a Company listed on resume should be the same font, size and style as all other company names). If the user 12 changes the font or formatting of a particular section of the resume, the resume section 18 will prompt the user 12 to change all similar sections of the resume to meet this standard. For instance, if the user 12 changes the font of one Section Title, the program will ask the user if the user 12 would like to make all other similar sections of the resume match the user's recent changes. This way, the user 12 does not have to go through each section of the resume making everything consistent.

The date format/date separator feature changes the format of dates throughout the resume to common resume date formats. An upper/lower feature lets the user 12 choose the formatting in section titles, since in a resume, it is very common to vary the case of the user's section titles.

Once the user 12 has chosen an appropriate style and formatting for the resume, the style and formatting information is stored in the formatting database 26, separate and apart from the resume data stored in the database 24. This allows the resume section to display two views of the resume: the card view, and a document view where the content of the resume is combined with the chosen formatting to provide a layout or WYSIWYG view of the resume.

Figure 4:
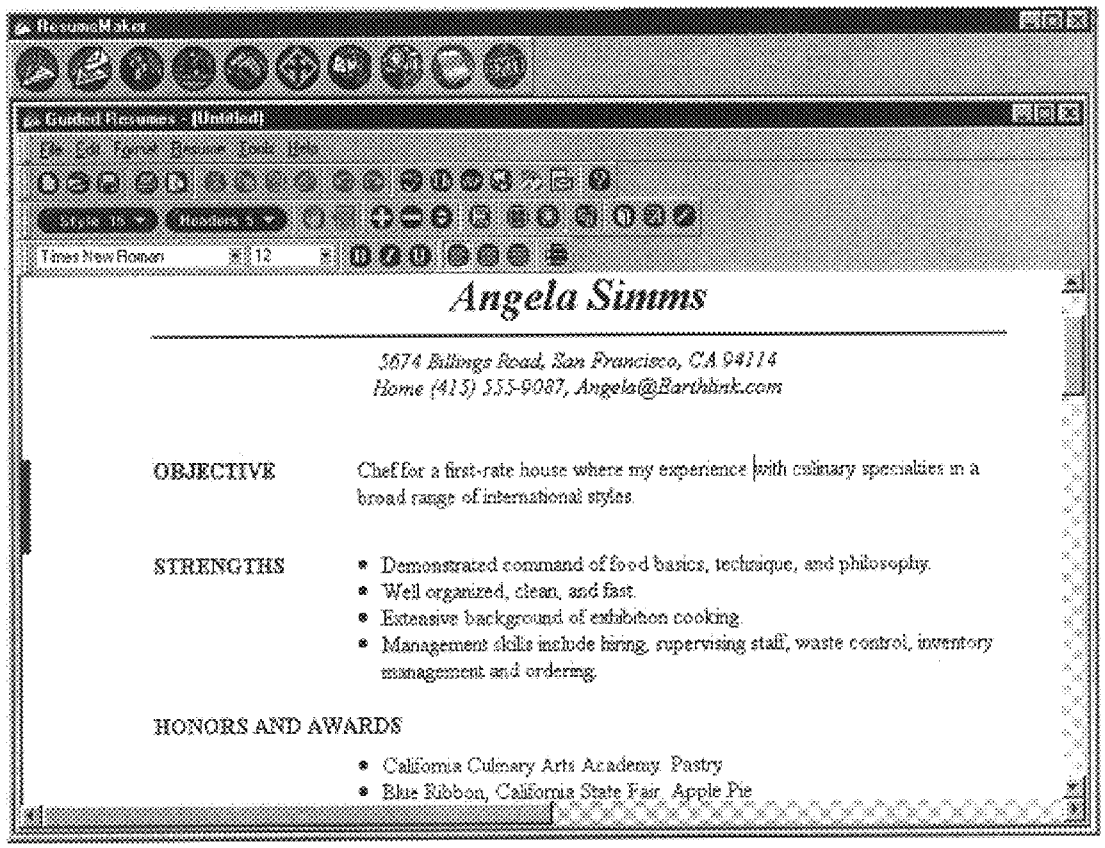
FIG. 4 is a block diagram illustrating the document view of a completed resume.

FIG. 4 is a block diagram illustrating the document view of a completed resume. According to one aspect of the present invention, the user may choose to edit the resume in both in the card view and in the document view. In the example shown, the user is editing the OBJECTIVE section of the resume, and any changes made are entered in the database 24. The resume application 10 uses the position of the cursor to determine which section of the resume the user is attempting to edit. The resume application 10 then determines which fields in the database 24 that section of the resume maps to.

When displayed in the document view, a single block of text in of the resume may comprise multiple fields from the database 24, and in most instances need to be separated by delimiters such as commas, semicolons, and so on. In the example resume shown in FIG. 4, for example, the user's telephone number is separated from the user's email address by a comma. However, the user does not enter delimiters when entering data into the fields. The present invention stores the layouts of resumes in the templates in the formatting database 26, including the position of each field in each block within the resume and the delimiters separating those fields. During editing of a resume in the document view, the user is not permitted to edit the delimiters. Rather, the user changes the delimiters using the style and formatting options displayed in the editing menus.

Referring again to FIG. 1, after the user has prepared his/her resume, the user may choose to locate jobs using the job finder section 20 or to submit the resume using the resume caster section 22. The job finder section 20 assists the user 12 in locating job openings listed with the career websites 14 that meet his/her preferences. The user 12 simply enters his/her job search criteria (job title and location) and clicks the search button and the job finder section 20 automatically performs a search of job openings at every major career website 14. As a search of each website 14 is completed, the job finder section 20 lists all the job openings in a consistent format. The user 12 may view a more detailed description of the job by clicking on the view job description, which causes a new browser window to open displaying the details of the job directly from the career website 14. The personal settings entered by the user 12 are remembered under the job finder's settings dialog so that the next time the user 12 uses this feature, the user 12 does not have to reenter the search criteria.

Figure 5:
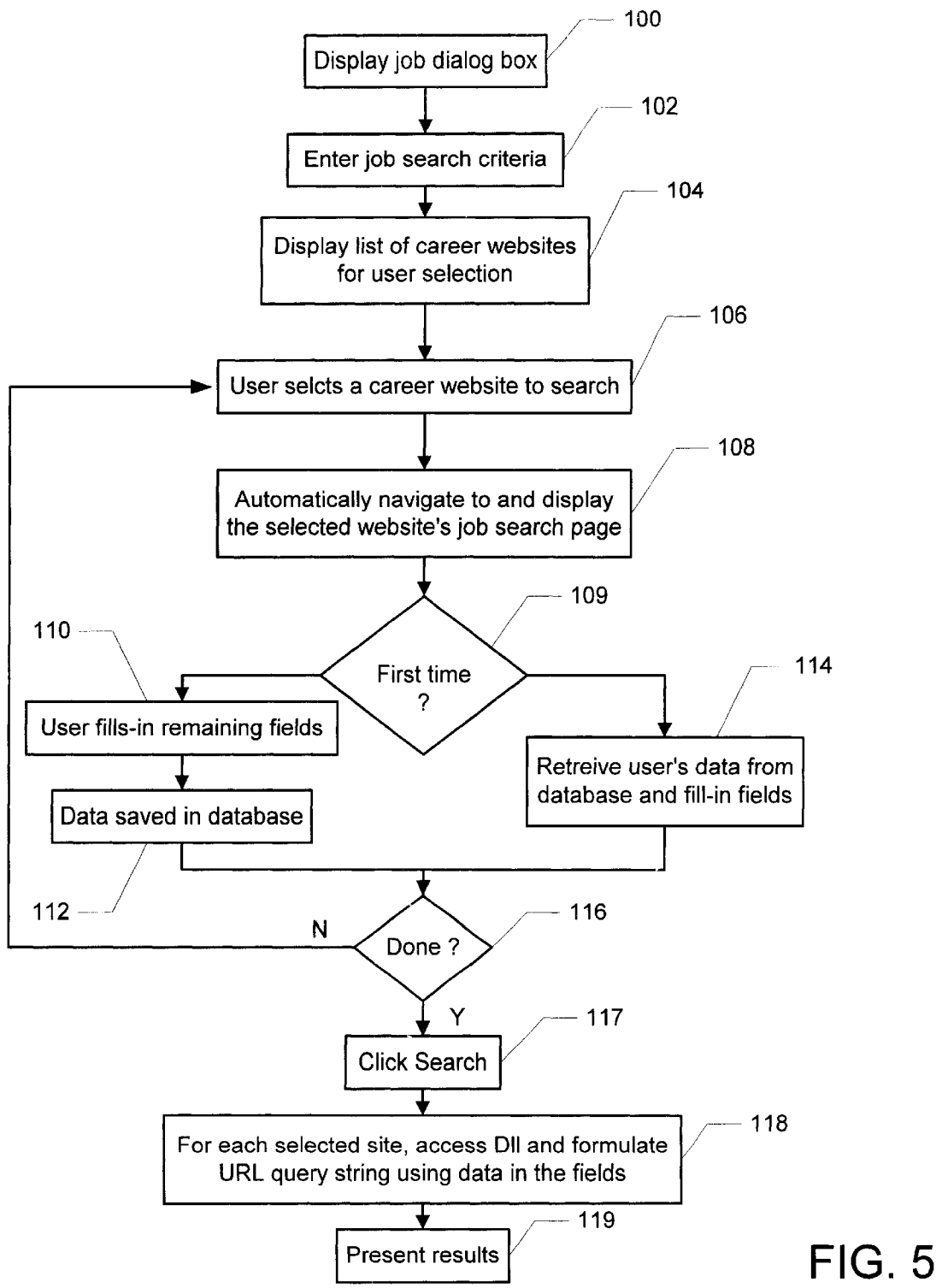
FIG. 5 is a flow chart illustrating the process for allowing the user to search for jobs at multiple career websites using the job finder feature in a preferred embodiment of the present invention.

FIG. 5 is a flow chart illustrating the process for allowing the user 12 to search for jobs at multiple career websites 14 using the job finder feature in a preferred embodiment of the present invention. The process begins in response to the user selecting the job finder feature in the resume application 10 by displaying a job finder dialog box in step 100.

Figure 6:
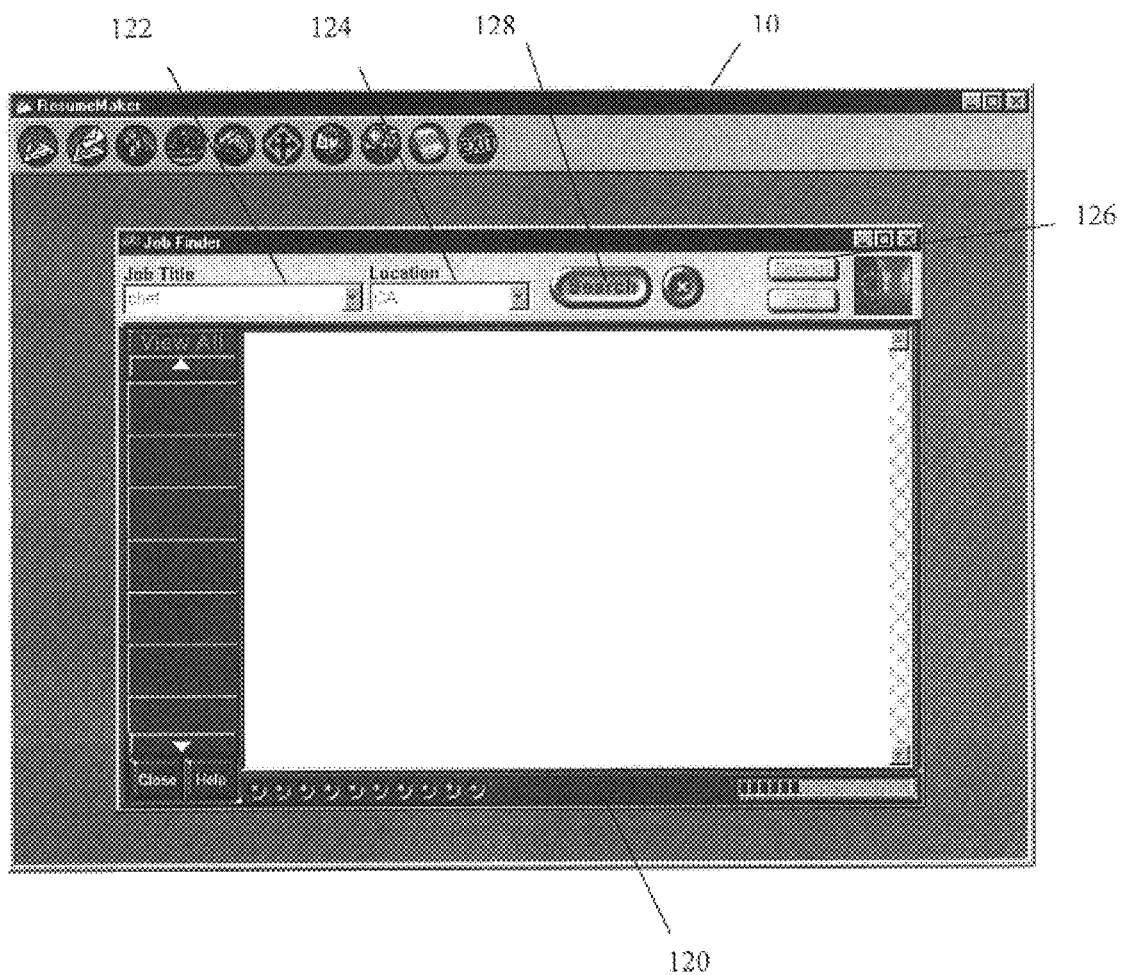
FIG. 6 is a block diagram showing an example of job finder dialog box displayed to the user.

FIG. 6 is a block diagram showing an example of job finder dialog box 120 displayed to the user 12. In a preferred embodiment, the job finder dialog box 120 includes a job title field 122, a location field 124, a settings button 126, and a search button 128.

Referring to both FIGS. 5 and 6, the user enters job search criteria in the in step 102 by entering to the name of the job for which to search in the job title field 122 and entering the desired state in the location field 124. If desired, the user 12 may perform a quick search by simply clicking the search button 128, in which case all the career websites 14 would be searched using the job title and state the user entered. However, due to the generic nature of the search criteria, the search results may be overly broad.

According to the present invention, the settings button 126 is provided to allow the user to narrow the search criteria at each websites 14. Upon clicking the settings button 126, a settings window opens displaying a list of career websites is displayed for user selection in step 104.

Figure 7:
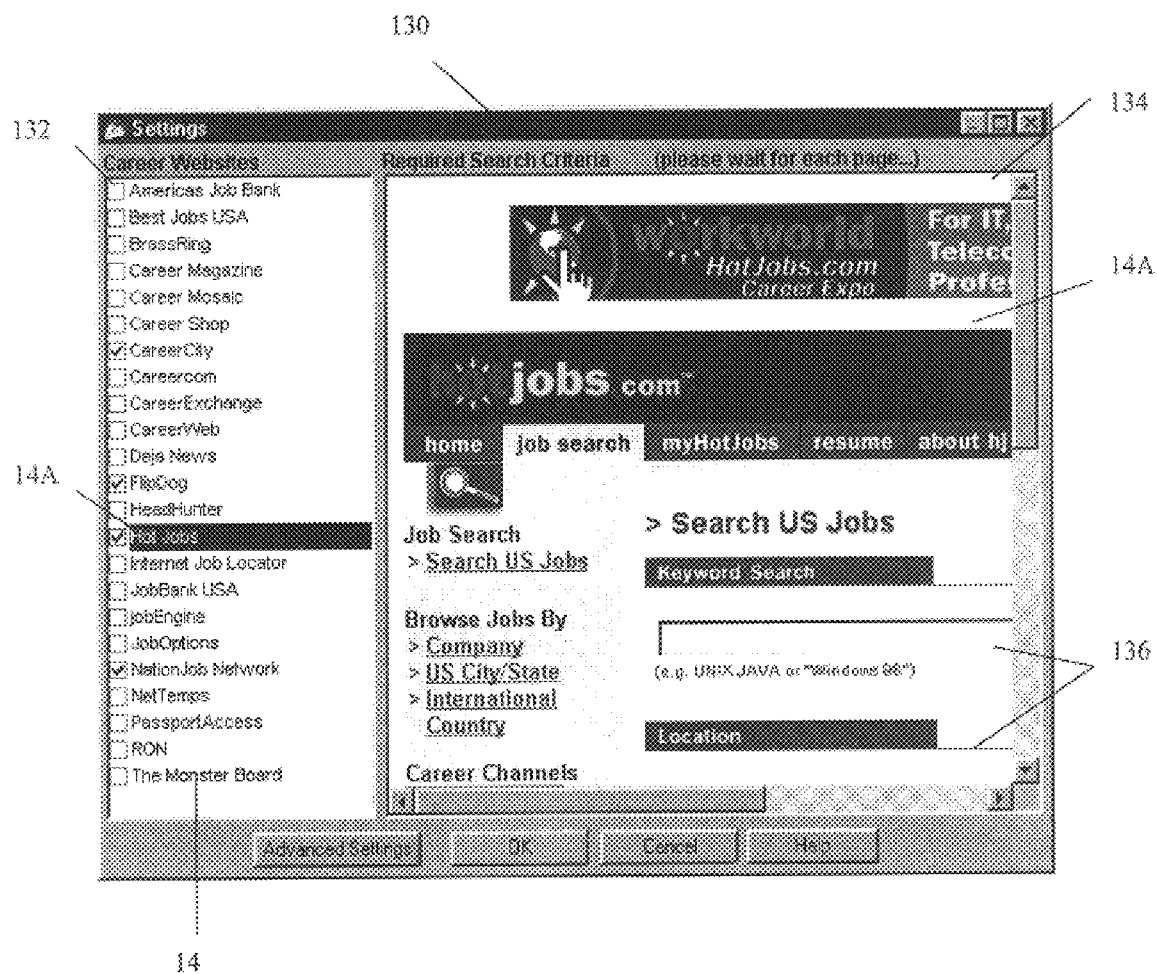
FIG. 7 is a block diagram illustrating an example settings window in accordance with a preferred embodiment of the present invention.

FIG. 7 is a block diagram illustrating an example settings window in accordance with a preferred embodiment of the present invention. The settings window 130 displays a split screen where one side displays a listing of career websites 14 and the other side displays a mini browser window 134.

Referring to both FIGS. 5 and 6, when the user selects a career website 14 to search in step 106 by clicking a check box, the job finder feature automatically navigates to and displays the selected career website's job search web page 14A in step 108. The web page 14A includes job search fields 136 specific to the career website 14A.

If it is the first time the user 12 has visited that career website 14, in step 109 the user 12 fills in the search fields 136 as desired in step 110 to narrow the search. For example, the user may choose to fill in a zip code and to search within a certain number of miles from the code, and so on. The data entered by the user in each field 136 is then stored in the database 24 in step 112. If it is not the first time the user has visited that career website 14, then the job search feature retrieves the user's data from the database 24 and automatically fills in all the search fields 136 with the previously entered data in step 114, preferably using dynamic HTML.

The user may then continue to select another career website 14 in step 116 and the process continues at step 106. When user has finished selecting websites 14 to search, the user 12 returns to the job finder dialog window 120 and clicks the search button 128 to begin the search in step 117. For each of the selected career websites 14, the job finder feature accesses the career website's DLL 28 and the data entered by the user 12 to formulate and send a URL query string to the website 14 in step 118. The results returned from each of the career websites are then presented to the user 12 in step 119 in a results window.

Figure 8:
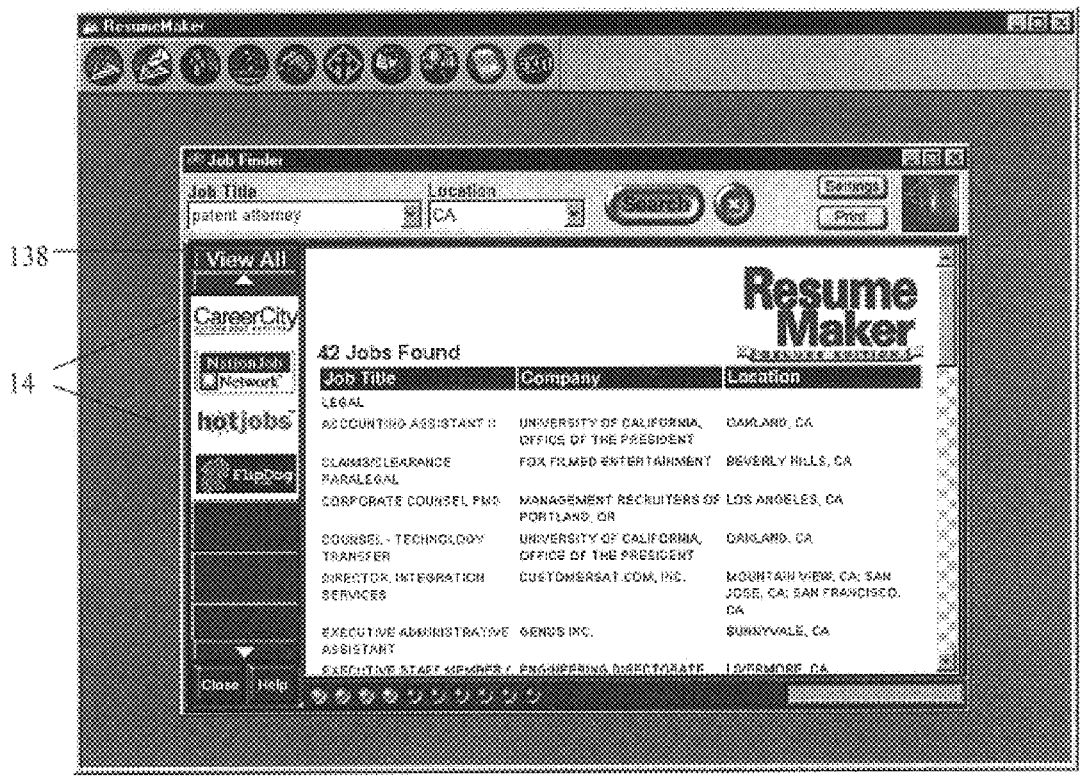
FIG. 8 is a block diagram illustrating the job finder results window.

FIG. 8 is a block diagram illustrating the job finder results window. In a preferred embodiment, as each career website 14 returns its results, a link to the career website 14 is displayed on one side of the split window. The user 12 may then click on the links to view each site's results, which are displayed on the other side of the split window. The user may also click the view all button 138 to see a listing of the combined results of all the websites 14.

Some career websites 14 only return X number of results at a time, while others allow the user to specify how many results are returned. The job finder section 20 has its own settings for how many results to return, and automatically displays that many results to the user, no matter how many results are returned from the career website 14. As an example, if the user 12 requested 50 results in the job finder section 20, but a particular career website 14 only allows ten results to be returned, then the job finder will examine the web page of results passed back from the career website 14, find the "next 10" link, and automatically invoke the link five times to gather the 50 results.

According to the job finder section 20 of the present invention, the benefit of one-click searching is combined with the benefit of entering search criteria specific to each career website 14 for more powerful searching, all within one interface, rather than entering a generic search using fields common to all sites or searching each site individually using a web browser. Also, the user 12 can change basic search criteria, like job title, without having to reset all criteria, like state, zip, etc.

Referring again to FIG. 1, after preparing a resume, the user may enter the resume caster section 22 to have the user's resume submitted online.

Figure 9:
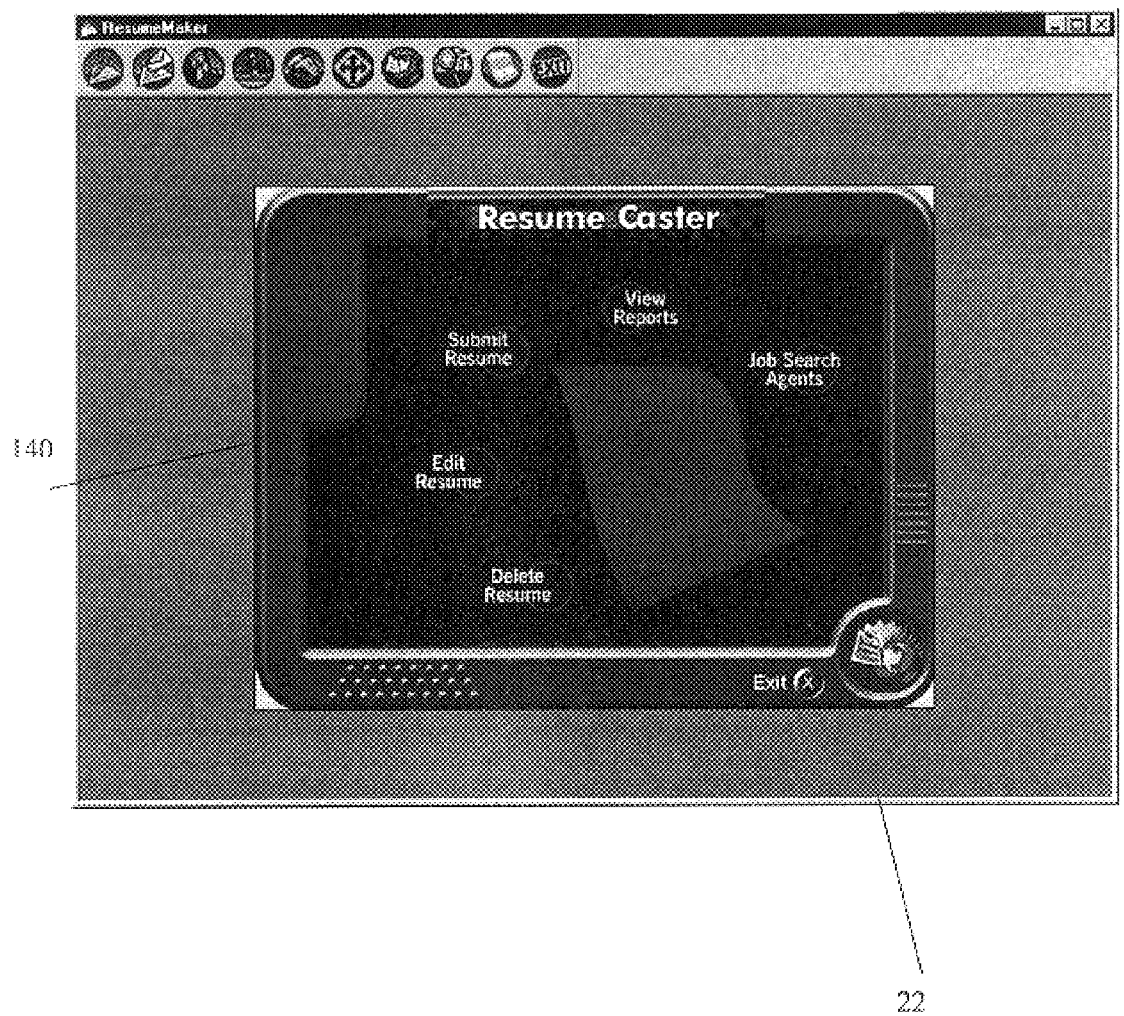
FIG. 9 is block diagram illustrating a main menu for the resume caster section.

FIG. 9 is block diagram illustrating a main menu for the resume caster section 22. The main menu 140 of the resume caster section 22 displays four primary functions that automate several necessary steps in a successful job search. The resume caster section 22 includes a submit resume feature, an edit resume feature, a delete resume feature, a job search agents feature, and a view reports feature.

The submit resume feature automatically submits the user's 12 resume to major career websites 14 on the Internet. This feature automates the resume submission at major career websites 14, saving the job seeker time and effort.

Figure 10:
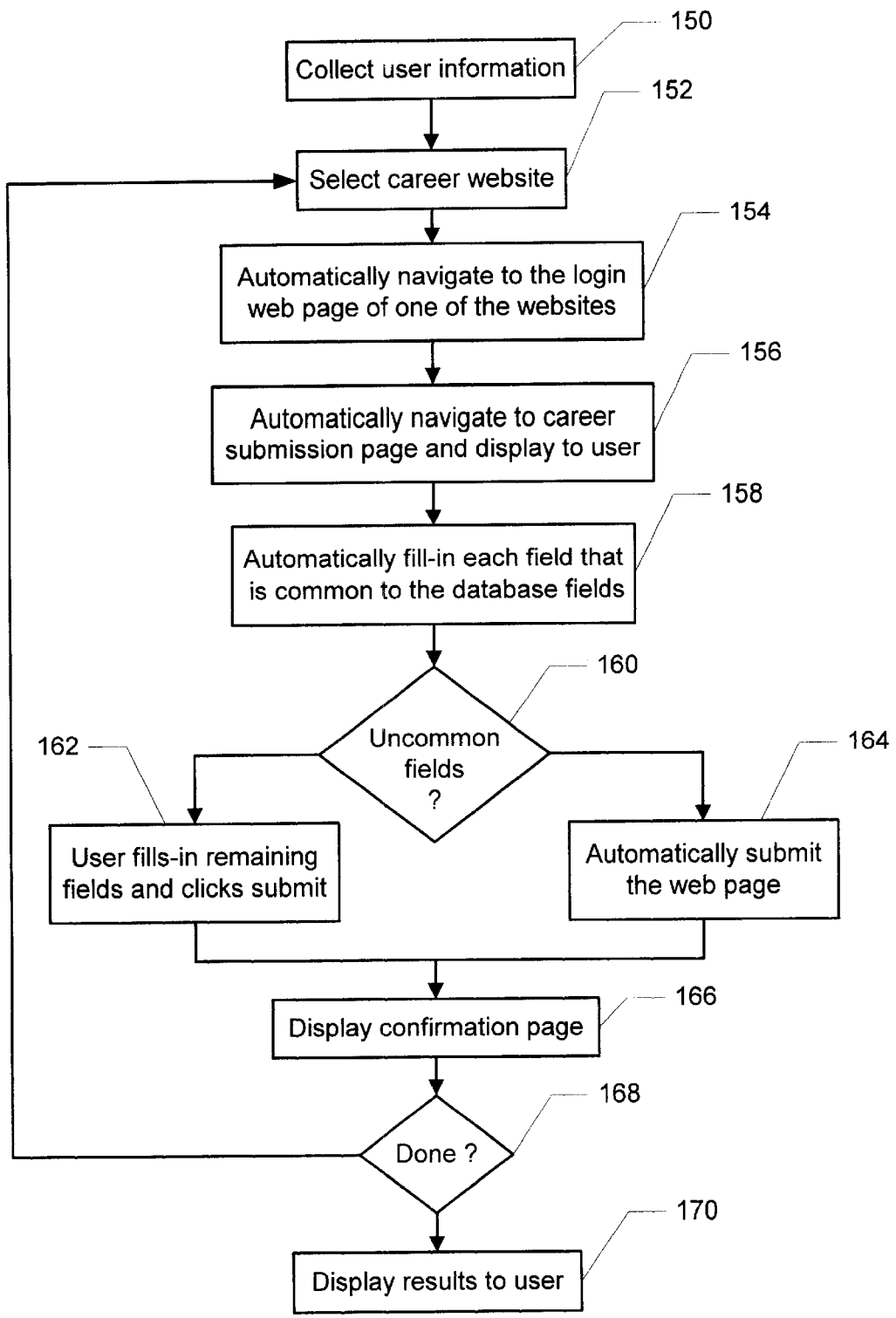
FIG. 10 is a flow chart illustrating a process for automatically submitting resumes to multiple career websites in accordance with a preferred embodiment of the present invention.

FIG. 10 is a flow chart illustrating a process for automatically submitting resumes to multiple career websites 14 in accordance with a preferred embodiment of the present invention. The submit resume feature begins with a step-by-step wizard process that collects all necessary personal and resume information which will be used to fill-in the appropriate fields at each career website 14 in step 150.

Figure 11:
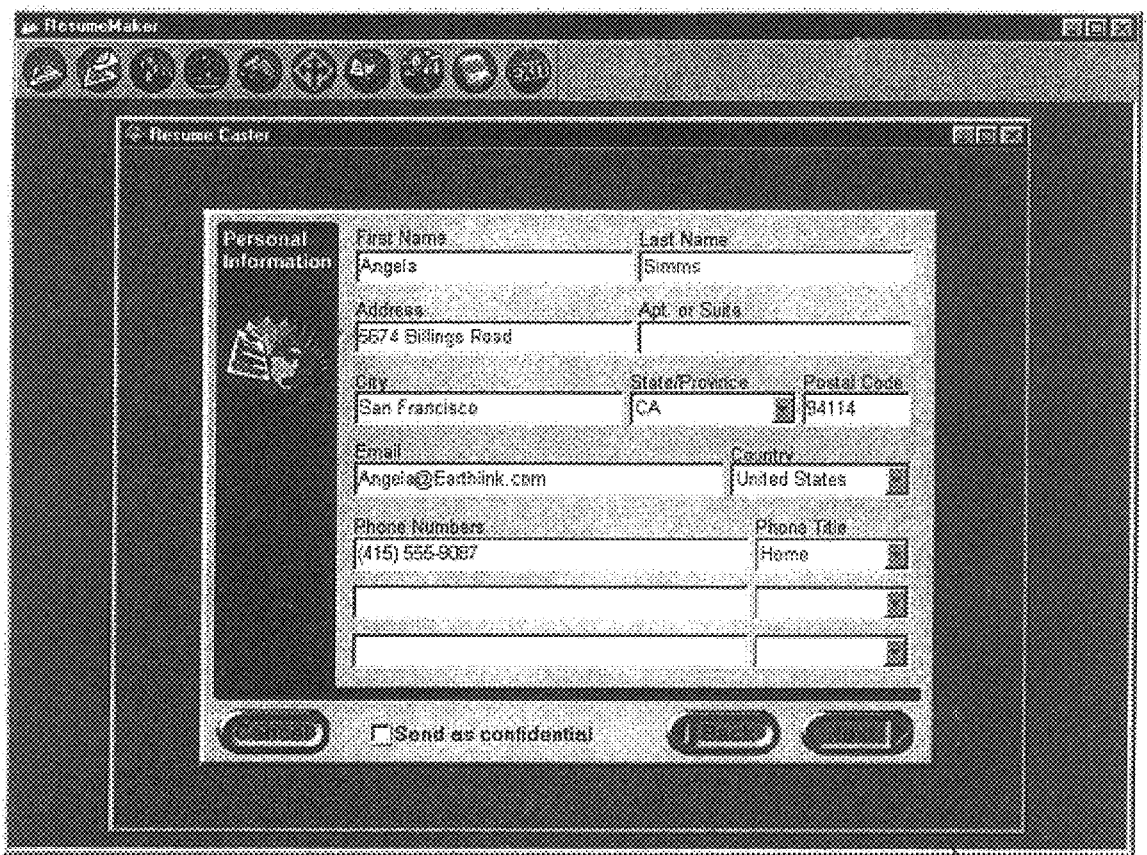
FIG. 11 is a block diagram illustrating an example form for collecting the user's personal information.

FIG. 11 is a block diagram illustrating an example form for collecting the user's personal information. The wizard also prompts the user to enter a user name and password, which will be used to automatically login at each of the career websites 14.

Figure 12:
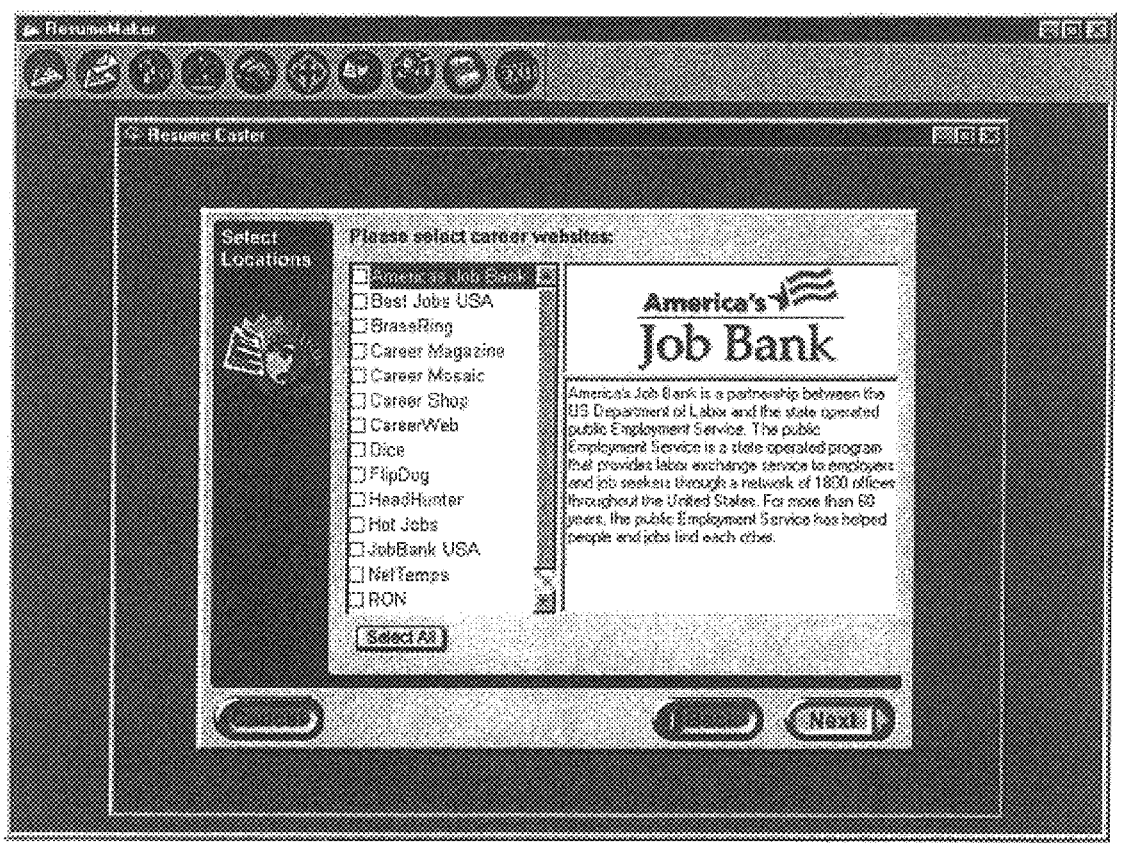
FIG. 12 is a block diagram illustrating an example dialog screen listing available career websites in which the user selects some of the career websites for resume submission.

Referring again to FIG. 10, after entering the requested information, the user 12 selects which of the career websites 14 to submit his/her resume in step 152. FIG. 12 is a block diagram illustrating an example dialog screen listing available career websites 14 in which the user selects some of the career websites 14 for resume submission.

Referring again to FIG. 10, after selecting the desired career websites 14, the resume caster 22 automatically navigates to the login page of one of the career websites 14, if the career website 14 requires an account to be set up before submitting a resume, and automatically fills in the user name and password fields with the user name and password supplied by the user in step 154. Thereafter, the resume caster 22 automatically navigates directly to the resume submission page of the career website 14 and displays the page to the user 12 in step 156. The resume caster 22 then automatically fills in each field in common to the database 24, or auto-selects each relevant choice, using the user's personal and resume information in step 158. If the web page includes fields that are uncommon to the fields in the database 24 in step 160, then the user 12 has the opportunity to fill in the missing information in step 162 and review the information and make any modifications before pressing the submit button. The information entered by the user 12 is saved in the database 24 so that the next time the user visits the website 14, the information will be automatically filled-in. If the page does not include any fields that are uncommon to the fields in the database 24, then the resume caster 22 automatically submits the page in step 164 by formulating a URL query string submitting using the information in the fields and submitting the URL query string. In addition to automatically navigating directly to the appropriate page of each career website 14 and automatically filling in fields with the users personal and resume information, the resume caster 22 can also submit an HITML version of the resume if the career website 14 supports HTML.

After the page is submitted, a confirmation page is displayed to the user indicating that the page has been submitted and optionally informing the user of his/her name and password in step 166. If additional career websites 14 were selected in step 168, then the process proceeds at step 152. Once the resume has been submitted to all the selected career websites 14, the user 12 is returned to the resume caster main menu 140 in step 170.

Referring again to FIG. 9, the edit resume feature allows the user 12 to automatically edit the resume at the career websites 14. Once a resume has been submitted, the user 12 may use job caster section 22 to update the resume at any time. This process (auto-navigate and auto-fill) is similar to submitting a resume, but will edit the resume instead.

The delete resume feature automatically removes the user's resume from career websites 14 to which it was submitted. After a job search is complete, the user 12 may want to remove their resume from the Internet. The resume caster section 22 automates this process as well. This process (auto-navigate and auto-fill) is similar to submitting a resume, but the resume will be removed instead.

The job search agents feature automatically signs the user 12 up for Job Agents at the career websites 14. Many career websites 14 offer a feature that allows the user to submit the user's email address and career interest and will send the user 12 an email whenever a new job opening appears that meets the user's criteria. The resume caster section 22 uses a similar process (auto-navigate and auto-fill) to sign the user up for job agents.

In a further embodiment, the resume application 10 includes an automatic update career websites feature that performs a check before using the resume caster section 22 or the job finder section 20 and automatically downloads and installs the latest DLLs 28 for the career websites 14 and also downloads the latest version of the resume application 10 so that the interaction between application 10 and the career websites 14 is always up to date.

A method and system for querying multiple career websites on the Internet from a single interface, including generating resumes and automatically submitting resumes to the career websites on the Internet, has been disclosed.

Although the present invention has been described in accordance with the embodiments shown, one of ordinary skill in the art will readily recognize that there could be variations to the embodiments and those variations would be within the spirit and scope of the present invention. Those with ordinary skill in the art will readily recognize that the resume application may be stored on a disk or any other computer-readable medium and/or transmitted over network, and executed by a processor from memory. Further the present invention is not intended to be limited by the hardware architecture of the computer. Accordingly, many modifications may be made by one or ordinary skill in the art without departing from the spirit and scope of the appended claims.

What is claimed is:

1. A method for querying multiple career websites from a single interface, each of the websites comprising a plurality of web pages having site-specific fields requiring input of data, the method comprising the steps of:
   (a) collecting information from a user;
   (b) mapping the user information to the site-specific fields of each of the career websites;
   (c) automatically filling-in the site-specific fields of each of the career websites with the mapped user information;
   (d) forming respective query strings from the filled-in site-specific fields of each of the career websites; and
   (e) submitting the respective query strings to the corresponding career websites.

2. The method of claim 1 wherein step (c) further comprises the steps of automatically navigating to a correct web page at each of the career websites.

3. The method of claim 2 further comprising the step of:
   (f) displaying responses from each of the career websites.

4. The method of claim 3 wherein step (c) further comprises the steps of using dynamic HTML to fill-in the site-specific fields.

5. The method of claim 4 wherein step (b) further comprises the step of storing the mapped user information in a database.

6. The method of claim 1 further comprising the steps of storing the user information in the first database; and storing formatting information in a second database.

7. The method of claim 6 further comprising the step of providing the second database with formatting templates describing different resume styles, including positions within the resume styles of fields of data from the first database and positions of delimiters in relation thereto.

8. The method of claim 7 further including the step of providing the user with an option to view the resume and document view and format view.

9. The method of claim 8 further including the step of displaying the resume and document view by combining information from the first database with the formatting information from the second database.

10. The method of claim 9 further comprising the step of allowing the user to edit the resume and document view.

11. The method of claim 1 further comprising the steps of:
   receiving search criteria from the user; and
   automatically filling-in search specific-fields of each of the career websites with the search criteria received from the user, thereby automatically submitting the search criteria to the multiple career websites.

12. The method of claim 11 further comprising the step of automatically filling-in search specific-fields that are common to fields in a first database used to store user information.

13. The method of claim 12 further comprising the steps of allowing user to fill-in search specific-fields that are uncommon to the fields in the first database.

14. The method of claim 13 further comprising the step of presenting results returned from each of the career websites to the user.

15. A computer-readable medium for querying multiple career websites from a single interface, each of the websites comprising a plurality of web pages having site-specific fields requiring input of data, the computer-readable medium comprising the instructions of:
   (a) collecting information from a user;
   (b) mapping the user information to the site-specific fields of each of the career websites;
   (c) automatically filling-in the site-specific fields of each of the career websites with the mapped user information;
   (d) forming respective query strings from the filled-in site-specific fields of each of the career websites; and
   (e) submitting the respective query strings to the corresponding career websites.

16. The computer-readable medium of claim 15 wherein instruction (c) further comprises the instructions of automatically navigating to a correct web page at each of the career websites.

17. The computer-readable medium of claim 16 further comprising the instruction of:
   (f) displaying responses from each of the career websites.

18. The computer-readable medium of claim 17 wherein instruction (c) further comprises the instructions of using dynamic HTML to fill-in the site-specific fields.

19. The computer-readable medium of claim 18 wherein instruction (b) further comprises the instruction of storing the mapped user information in a database.

20. The computer-readable medium of claim 16 further comprising the instructions of
   storing the user information in the first database; and
   storing formatting information in a second database.

21. The computer-readable medium of claim 20 further comprising the instruction of providing the second database with formatting templates describing different resume styles, including positions within the resume styles of fields of data from the first database and positions of delimiters in relation thereto.

22. The computer-readable medium of claim 21 further including the instruction of providing the user with an option to view the resume and document view and format view.

23. The computer-readable medium of claim 22 further including the instruction of displaying the resume and document view by combining information from the first database with the formatting information from the second database.

24. The computer-readable medium of claim 23 further comprising the instruction of allowing the user to edit the resume and document view.

25. The computer-readable medium of claim 15 further comprising the instructions of:
   receiving search criteria from the user; and
   automatically filling-in search specific-fields of each of the career websites with the search criteria received from the user, thereby automatically submitting the search criteria to the multiple career websites.

26. The computer-readable medium of claim 25 further comprising the instruction of automatically filling-in search specific-fields that are common to fields in a first database used to store user information.

27. The computer-readable medium of claim 26 further comprising the instructions of allowing user to fill-in search specific-fields that are uncommon to the fields in the first database.

28. The computer-readable medium of claim 27 further comprising the instruction of presenting results returned from each of the career websites to the user.

29. A system for querying multiple career websites from a single interface, each of the websites comprising a plurality of web pages having site-specific fields requiring input of data, comprising:
   means for collecting information from a user;
   means for mapping the user information to the site-specific fields of each of the career websites;
   means for automatically filling-in the site-specific fields of each of the career websites with the mapped user information;
   means for forming respective query strings from the filled-in site-specific fields of each of the career websites; and
   means for submitting the respective query strings to the corresponding career websites.

30. The system of claim 29 further including means for automatically navigating to a correct web page at each of the career websites.

31. The system of claim 30 wherein responses from each of the career websites are displayed to the user.

32. The system of claim 31 wherein the site-specific fields are filled-in using dynamic HTML.

33. The system of claim 32 wherein the mapped user information is stored in a database.

34. The system of claim 29 further comprising the instructions of
   means for storing the user information in the first database; and
   means for storing formatting information in a second database.

35. The system of claim 34 wherein the second database includes formatting templates describing different resume styles, including positions within the resume styles of fields of data from the first database and positions of delimiters in relation thereto.

36. The system of claim 35 wherein the user is provided with an option to view the resume and document view and format view.

37. The system of claim 36 wherein the resume is displayed in document view by combining information from the first database with the formatting information from the second database.

38. The system of claim 37 wherein the user may edit the resume and document view.

39. The system of claim 29 further including:
   means for receiving search criteria from the user; and
   means for automatically filling-in search specific-fields of each of the career websites with the search criteria received from the user, thereby automatically submitting the search criteria to the multiple career websites.

40. The system of claim 39 wherein search specific-fields that are common to fields in a first database used to store user information are automatically filled in.

41. The system of claim 40 wherein the user is allowed to fill-in search specific-fields that are uncommon to the fields in the first database.

42. The system of claim 41 wherein results returned from each of the career websites are presented to the user.

43. A method of performing a job search on multiple career websites from a single application program, comprising the steps of:
   (a) allowing the user to enter search criteria by entering a title for the job to be searched and a location of the job; and
   (b) allowing the user to narrow the search by
      (i) selecting one or more career websites to search,
      (ii) a automatically navigating to and displaying a job search web page of one of the career websites, wherein the web page includes job search fields specific to the career website,
      (iii) if it is the first time the user has visited the career website, allowing the user to fill-in the search fields with data, and storing the data in a database,
      (iv) if it is not the first time the user has visited the career website, automatically filling-and the search fields with data stored in the database,
      (v) repeating steps (ii) through (iv) for each selected career website,
      (vi) formulating a URL query string for each of the career websites using the data entered by the user, and sending the URL query strings to the corresponding career websites, and
      (vii) presenting results returned from each of the career websites to the user.

44. The method of claim 43 further comprising the step of filling-in the search fields using dynamic HTML.

45. The method of claim 44 further including the step of automatically displaying a predetermined number of results to the user from each of the career websites even if the career websites return a limited number of results at a time.

46. A method for automatically submitting a user's resume to multiple career websites from an application program, comprising the steps of:
   (a) prompting the user to enter a user name and password;
   (b) allowing the user to select one or more career websites;
   (c) automatically navigating to a login page of one of the career websites if the career website requires account information, and automatically filling-in the user name and password;

(d) automatically navigating directly to a resume submission page of the career websites, and displaying the web page to the user;
(e) automatically filling-in fields on the resumes missing page using user information stored in a database;
(f) if the web page includes fields not stored in the database, allowing the user to fill-in those fields with data;
(g) formulating a URL query string submitting using the information in the fields and submitting the URL query string to the career of website; and
(h) repeating steps (c) through (g) for each selected career website.

47. The method of claim 46 further including the step of displaying a confirmation to the user indicating that the resume has been submitted.

48. The method of claim 47 further including the step of allowing the user to edit the resume whereby the edited resume is automatically resubmitted to each of the selected career websites.

49. The method of claim 48 further including the step of allowing the user to delete the resume whereby the user's resume is automatically removed from each of the selected career websites.

* * * * *

UNITED STATES PATENT AND TRADEMARK OFFICE
CERTIFICATE OF CORRECTION

PATENT NO. : 6,363,376 B1
DATED : March 26, 2002
INVENTOR(S) : Ken Wiens et al.

It is certified that error appears in the above-identified patent and that said Letters Patent is hereby corrected as shown below:

Drawings,
FIG. 2, change the second occurrence of "60" to -- 62 --.

Column 1,
Line 44, replace "store's" with -- stores --.

Column 3,
Line 47, replace "users" with -- user's --.
Line 67, replace "the" with -- then --.

Column 4,
Line 6, replace "querying" with -- query --.
Line 12, after "for" add -- a --.
Line 24, replace "in" with -- In --.
Line 54, replace "etc," with -- etc., --.

Column 5,
Line 22, replace "etc." with -- etc., --.

Column 6,
Line 38 after "the" and before "step", remove "in".

Column 7,
Line 9, after "When" add -- the --.

Column 8,
Line 39, replace "users" with -- user's --.

Column 9,
Line 26, before "network" add -- the --.
Line 26, replace "Further" with -- Further, --.

UNITED STATES PATENT AND TRADEMARK OFFICE
CERTIFICATE OF CORRECTION

PATENT NO.   : 6,363,376 B1
DATED        : March 26, 2002
INVENTOR(S)  : Ken Wiens et al.

It is certified that error appears in the above-identified patent and that said Letters Patent is hereby corrected as shown below:

<u>Column 9 (cont'd),</u>
Line 33, replace claim 1 with:

1. A method for querying multiple career websites from a single interface, each of the websites comprising a plurality of web pages having site-specific fields requiring input of data, the method comprising the steps of:

(a) collecting information from a user;

(b) mapping the user information to the site-specific fields of each of the career websites;

(c) automatically filling-in the site-specific fields of each of the career websites with the mapped user information;

(d) forming respective query strings from the filled-in site-specific fields of each of the career websites;

(e) submitting the respective query strings to the corresponding career websites;

(f) receiving a resume from a user in electronic form, wherein the resume includes information collected from the user; and (g) automatically filling-in resume-specific fields of each of the career websites with the user information to thereby automatically submit the resume to the multiple career websites.

<u>Column 10,</u>
Line 26, replace claim 15 with:

15. A computer-readable medium for querying multiple career websites from a single interface, each of the websites comprising a plurality of web pages having site-specific fields requiring input of data, the computer-readable medium comprising the instructions of:

(a) collecting information from a user;

(b) mapping the user information to the site-specific fields of each of the career websites;

(c) automatically filling-in the site-specific fields of each of the career websites with the mapped user information;

(d) forming respective query strings from the filled-in site-specific fields of each of the career websites;

(e) submitting the respective query strings to the corresponding career websites;

(f) receiving a resume from a user in electronic form, wherein the resume includes information collected from the user; and (g) automatically filling-in resume-specific fields of each of the career websites with the user information to thereby automatically submit the resume to the multiple career websites.

UNITED STATES PATENT AND TRADEMARK OFFICE
CERTIFICATE OF CORRECTION

PATENT NO. : 6,363,376 B1
DATED : March 26, 2002
INVENTOR(S) : Ken Wiens et al.

It is certified that error appears in the above-identified patent and that said Letters Patent is hereby corrected as shown below:

Column 11,
Line 27, replace claim 29 with:

29. A system for querying multiple career websites from a single interface, each of the websites comprising a plurality of web pages having site-specific fields requiring input of data, comprising:

means for collecting information from a user;

means for mapping the user information to the site-specific fields of each of the career websites;

means for automatically filling-in the site-specific fields of each of the career websites with the mapped user information;

means for forming respective query strings from the filled-in site-specific fields of each of the career websites;

means for submitting the respective query strings to the corresponding career websites;

means for receiving a resume from a user in electronic form, wherein the resume includes information collected from the user; and means for automatically filling-in resume-specific fields of each of the career websites with the user information to thereby automatically submit the resume to the multiple career websites.

Column 12,
Line 21, replace claim 43 with:

43. A method of performing a job search on multiple career websites from a single application program, comprising the steps of:

(a) allowing the user to enter search criteria by entering a title for the job to be searched and a location of the job;

(b) allowing the user to narrow the search by (I) selecting one or more career websites to search, (ii) automatically navigating to and displaying a job search web page of one of the career websites, wherein the web page includes job search fields specific to the career website, (iii) if it is the first time the user has visited the career website, allowing the user to fill-in the search fields with data, and storing the data in a database,

UNITED STATES PATENT AND TRADEMARK OFFICE
CERTIFICATE OF CORRECTION

PATENT NO. : 6,363,376 B1
DATED : March 26, 2002
INVENTOR(S) : Ken Wiens et al.

It is certified that error appears in the above-identified patent and that said Letters Patent is hereby corrected as shown below:

Column 12 (cont'd),
Line 21, replace claim 43 with:

(iv) if it is not the first time the user has visited the career website, automatically filling-in the search fields with data stored in the database, (v) repeating steps (ii) through (iv) for each selected career website, (vi) formulating a URL query string for each of the career websites using the data entered by the user, and sending the URL query strings to the corresponding career websites, (vii) presenting results returned from each of the career websites to the user;

(c) receiving a resume from a user in electronic form, wherein the resume includes information collected from the user; and (d) automatically filling-in resume-specific fields of each of the career websites with the user information to thereby automatically submit the resume to the multiple career website.

Line 57, replace claim 46 with:

46. A method for automatically submitting a user's resume to multiple career websites from an application program, comprising the steps of:

(a) prompting the user to enter a user name and password;

(b) allowing the user to select one or more career websites;

(c) automatically navigating to a login page of one of the career websites if the career website requires account information, and automatically filling-in the user name and password;

(d) automatically navigating directly to a resume submission page of the career websites, and displaying the web page to the user;

UNITED STATES PATENT AND TRADEMARK OFFICE
CERTIFICATE OF CORRECTION

PATENT NO.    : 6,363,376 B1
DATED         : March 26, 2002
INVENTOR(S)   : Ken Wiens et al.

It is certified that error appears in the above-identified patent and that said Letters Patent is hereby corrected as shown below:

<u>Column 12 (cont'd),</u>

(e)   automatically filling-in fields on the resumes missing page using user information stored in a database;

(f)   if the web page includes fields not stored in the database, allowing the user to fill-in those fields with data;

(g)   formulating a URL query string submitting using the information in the fields and submitting the URL query string to the career of website;

(h)   repeating steps (c) through (g) for each selected career website;

(i)   receiving a resume from a user in electronic form, wherein the resume includes information collected from the user; and (j)   automatically filling-in resume-specific fields of each of the career websites with the user information to thereby automatically submit the resume to the multiple career websites.

Signed and Sealed this

Sixteenth Day of December, 2003

JAMES E. ROGAN
*Director of the United States Patent and Trademark Office*